(12) United States Patent
Hamachi et al.

(10) Patent No.: US 11,545,680 B2
(45) Date of Patent: Jan. 3, 2023

(54) FUEL CELL SYSTEM

(71) Applicant: HONDA MOTOR CO., LTD., Tokyo (JP)

(72) Inventors: Masakazu Hamachi, Wako (JP); Masaoki Inamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 17/068,124

(22) Filed: Oct. 12, 2020

(65) Prior Publication Data

US 2021/0119232 A1 Apr. 22, 2021

(30) Foreign Application Priority Data

Oct. 18, 2019 (JP) .............................. JP2019-190876

(51) Int. Cl.
| | | |
|---|---|---|
| *H01M 8/04* | (2016.01) | |
| *H01M 8/04082* | (2016.01) | |
| *H01M 8/04664* | (2016.01) | |
| *H01M 8/0438* | (2016.01) | |
| *H01M 8/04858* | (2016.01) | |
| *H01M 8/04746* | (2016.01) | |
| *H01M 8/04089* | (2016.01) | |

(52) U.S. Cl.
CPC ..... *H01M 8/04201* (2013.01); *H01M 8/0494* (2013.01); *H01M 8/04097* (2013.01); *H01M 8/04388* (2013.01); *H01M 8/04686* (2013.01); *H01M 8/04753* (2013.01); *H01M 8/04761* (2013.01); *H01M 2250/20* (2013.01)

(58) Field of Classification Search
CPC ......... H01M 8/04201; H01M 8/04097; H01M 8/04388; H01M 8/04686; H01M 8/04753; H01M 8/04761; H01M 8/0494; H01M 2250/20

USPC ......................................................... 429/415
See application file for complete search history.

(56) References Cited

U.S. PATENT DOCUMENTS

| | | | |
|---|---|---|---|
| 2018/0175419 A1 | 6/2018 | Hasegawa | |
| 2019/0181472 A1* | 6/2019 | Saito ................. | H01M 8/04089 |
| 2019/0267650 A1* | 8/2019 | Egawa ................... | G05B 11/06 |
| 2019/0312288 A1* | 10/2019 | Tsubouchi ........ | H01M 8/04089 |

FOREIGN PATENT DOCUMENTS

| | | |
|---|---|---|
| JP | 2017-152261 A | 8/2017 |
| JP | 2018-101572 A | 6/2018 |

OTHER PUBLICATIONS

Office Action dated Jul. 27, 2021 issued over the corresponding Japanese Patent Application No. 2019-190876 with the English translation thereof.

* cited by examiner

*Primary Examiner* — James M Erwin
(74) *Attorney, Agent, or Firm* — Carrier Blackman & Associates, P.C.; Joseph P. Carrier; Fulchand P. Shende

(57) ABSTRACT

A fuel cell system includes a fuel cell stack, a plurality of injectors capable of adjusting a flow rate of anode gas supplied to the fuel cell stack, and an ECU causing the plurality of injectors to operate. The plurality of injectors include a main injector, and a BP injector that operates when power that exceeds a prescribed power generation amount is generated. The ECU performs an operational check of causing the BP injector to operate at least once and judging whether the BP injector is normal or abnormal, during a period from when the fuel cell system is activated to when the fuel cell system stops.

9 Claims, 7 Drawing Sheets

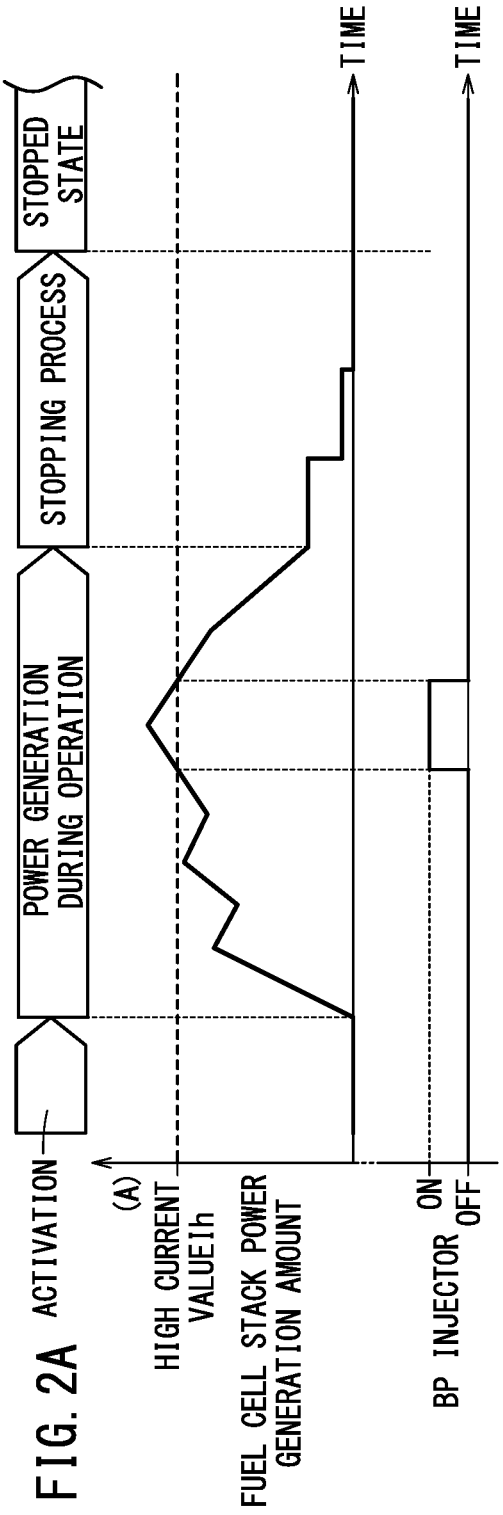
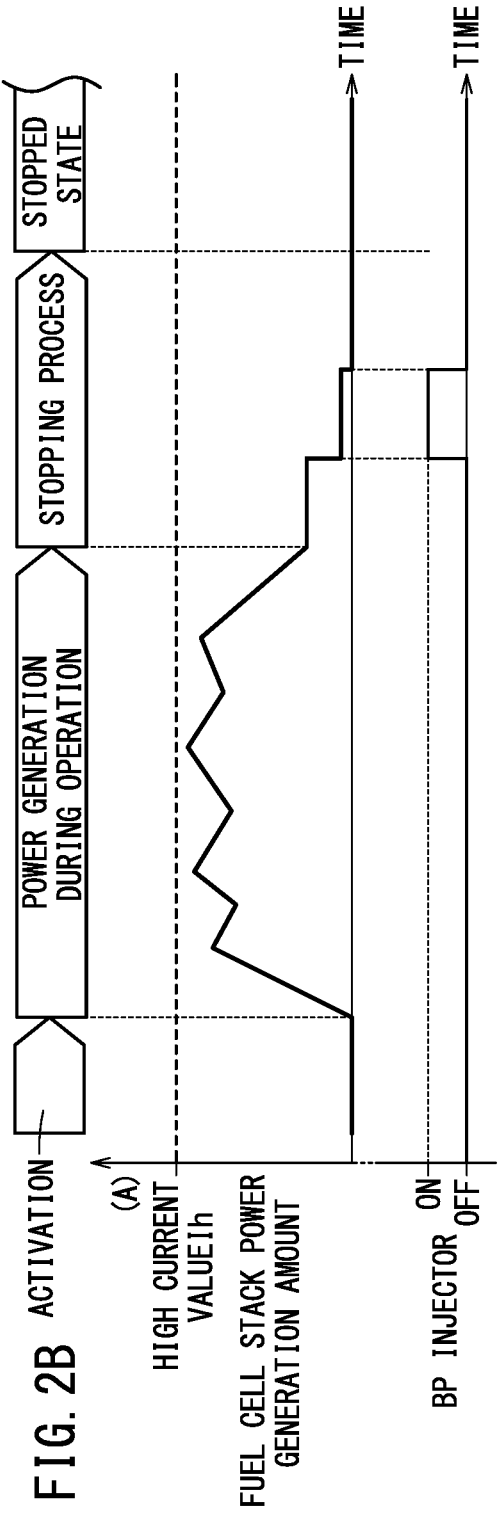

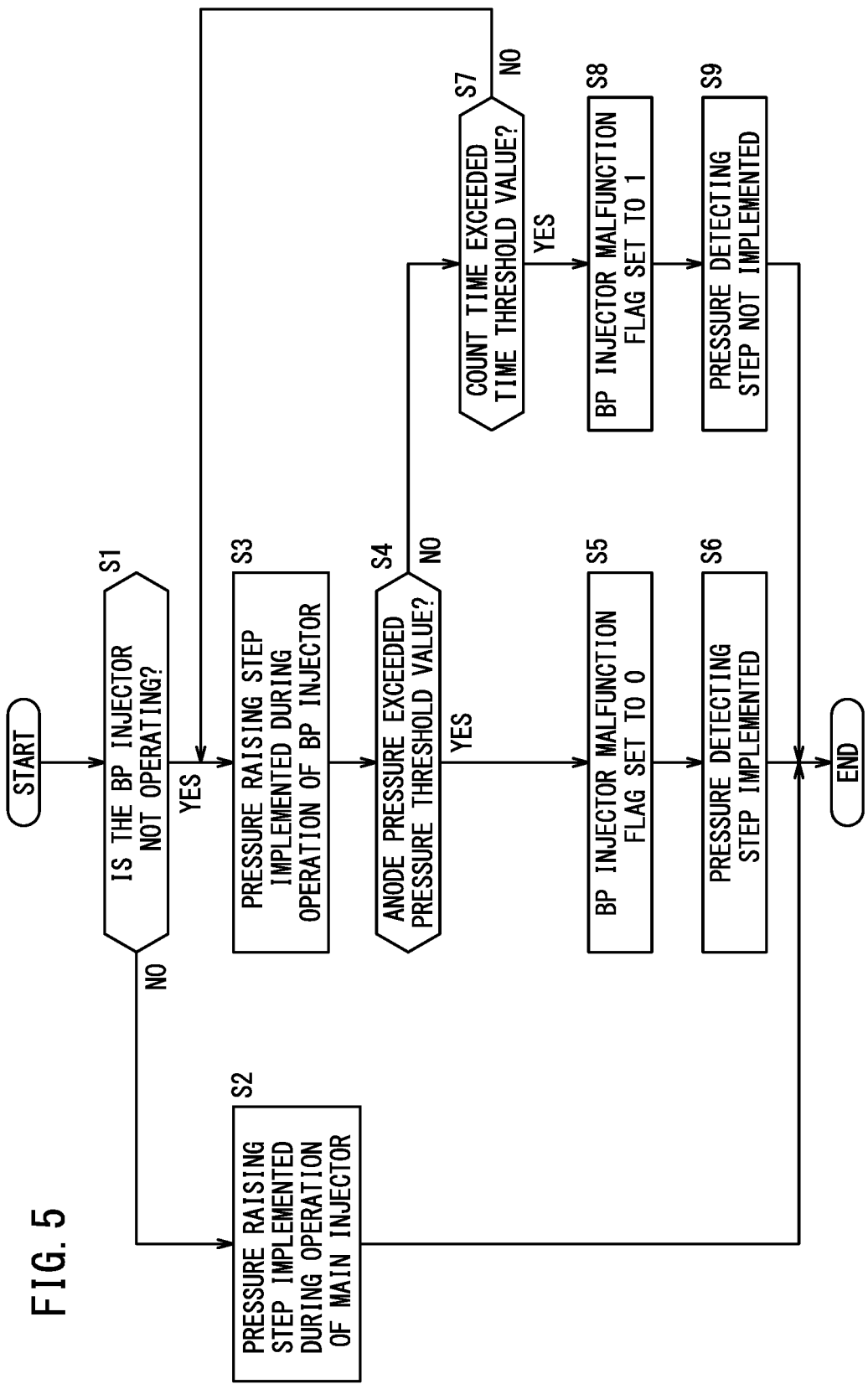

FUEL CELL SYSTEM

CROSS-REFERENCE TO RELATED APPLICATION

This application is based upon and claims the benefit of priority from Japanese Patent Application No. 2019-190876 filed on Oct. 18, 2019, the contents of which are incorporated herein by reference.

BACKGROUND OF THE INVENTION

Field of the Invention

The present invention relates to a fuel cell system including a plurality of valve apparatuses that adjust the flow rate of a reactant gas.

Description of the Related Art

A fuel cell system includes fuel cell stack that performs power generation through a reaction between an anode gas (fuel gas such as hydrogen) and a cathode gas (oxygen-containing gas such as oxygen), an anode system apparatus that supplies the anode gas, and a cathode system apparatus that supplies the cathode gas.

As disclosed in Japanese Laid-Open Patent Publication No. 2018-101572, an anode system apparatus includes a plurality of injectors (valve apparatuses) that adjust the flow rate of the anode gas, in the anode gas supply flow path. The plurality of injectors are controlled by a control section of the fuel cell system in a manner to change the number of injectors being driven according to the power generation amount of the fuel cell stack, thereby making it possible to supply the anode gas to the fuel cell stack with a target flow rate.

SUMMARY OF THE INVENTION

In the fuel cell system disclosed in Japanese Laid-Open Patent Publication No. 2018-101572, when the power demanded during a single operation (process from activation to stopping) is less than a prescribed power generation amount, there are injectors that do not operate even once among the plurality of injectors (valve apparatuses). When an abnormality (malfunction) occurs in an injector that has not operated even once, it is impossible to supply the fuel cell stack with at least a prescribed amount of anode gas, and therefore the flow rate of the anode gas is not increased even though there is a demand for this injector to operate during the next process. As a result, stable power generation cannot be achieved due to the insufficient supply of the anode gas, and problems such as deterioration of the fuel cell stack occur.

The present invention has been devised taking into consideration the aforementioned problem, and has the object of providing a fuel cell system that can reliably and quickly recognize an abnormality in a valve apparatus, by causing the valve apparatus to operate at least once during a single operation of the fuel cell system.

In order to achieve the aforementioned object, an aspect of the present invention is a fuel cell system comprising a fuel cell stack; a plurality of valve apparatuses configured to adjust a flow rate of a reactant gas supplied to the fuel cell stack; and a control section configured to control operation of the plurality of valve apparatuses, wherein the plurality of valve apparatuses include a first valve apparatus configured to operate when the fuel cell stack generates power that is less than or equal to a prescribed power generation amount, and a second valve apparatus configured to operate in addition to the first valve apparatus when the fuel cell stack generates power that exceeds the prescribed power generation amount; and the control section performs an operational check of causing the second valve apparatus to operate at least once and judging whether the second valve apparatus is normal or abnormal, during a period from when the fuel cell system is activated to when the fuel cell system stops.

The fuel cell system can quickly and reliably recognize an abnormality in the second valve apparatus, by performing the operational check of the second valve apparatus at least once during the single operation from when the fuel cell system is activated to when the fuel cell system stops. Then, by recognizing the abnormality in the second valve apparatus, the fuel cell system can restrict the power generation amount of the fuel cell stack and prevent the supply amount of the anode gas from becoming insufficient to meet demand, restrict unstable power generation, and stop deterioration of the fuel cell stack.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2A is a time chart showing a state in which a BP injector has operated in the power generation during operation, and FIG. 2B is a time chart showing a state in which the BP injector has not operated in the power generation during operation;

FIG. 5 is a flow chart showing the process flow of an operational check in the stopping process of the fuel cell system;

DESCRIPTION OF THE PREFERRED EMBODIMENTS

Preferred embodiments of the present invention will be presented and described below with reference to the accompanying drawings.

Figure 1:
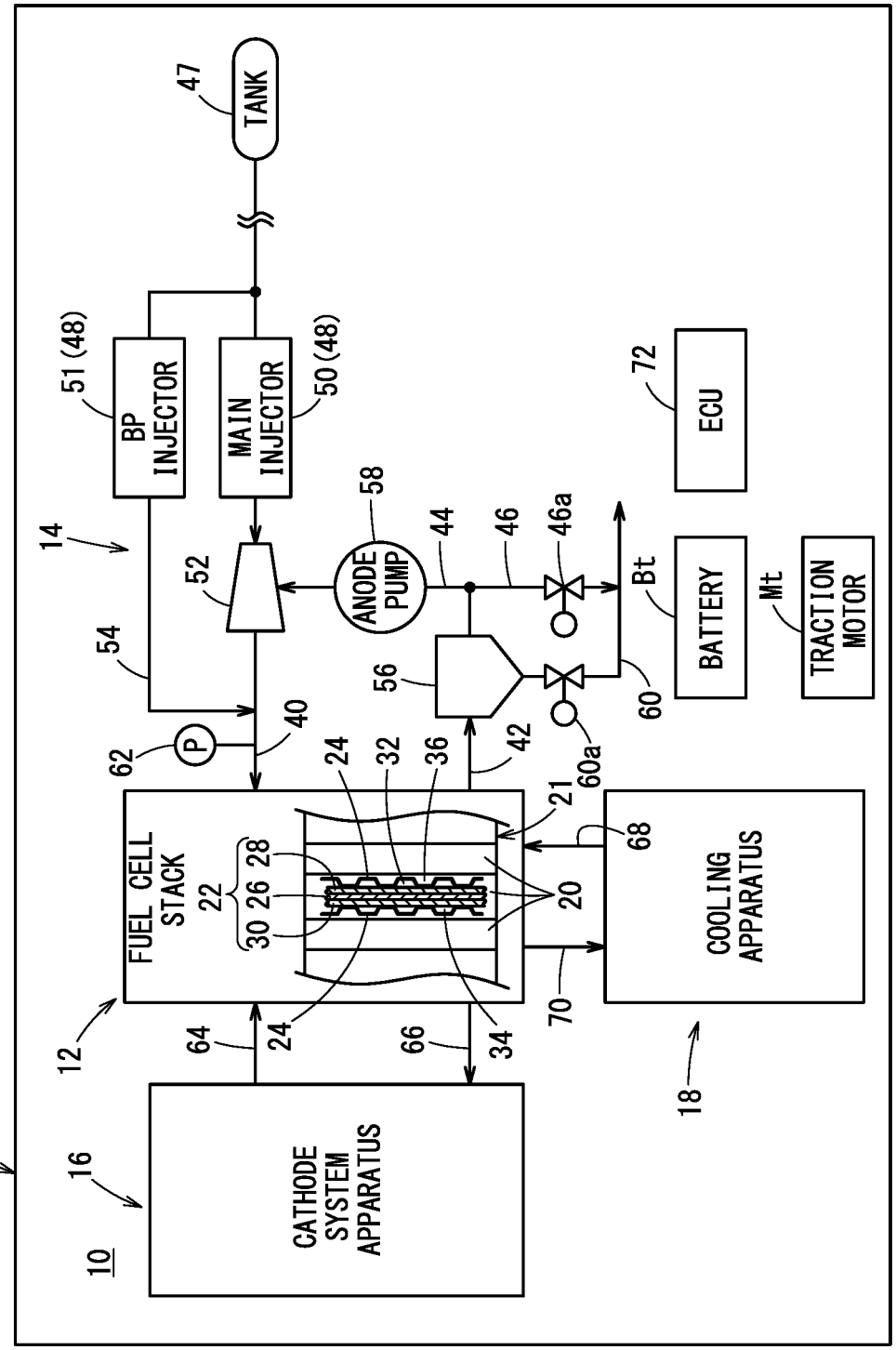
FIG. 1 is a descriptive diagram showing an overall configuration of a fuel cell system according to an embodiment of the present invention.

As shown in FIG. 1, a fuel cell system 10 according to an embodiment of the present invention includes a fuel cell stack 12, an anode system apparatus 14, a cathode system apparatus 16, and a cooling apparatus 18. This fuel cell system 10 is mounted in a motor room of a fuel cell vehicle 11 (referred to as a fuel cell automobile and simply as a vehicle 11 below), and causes the vehicle 11 to travel by supplying the generated power of the fuel cell stack 12 to a battery Bt, a traction motor Mt, and the like.

The fuel cell stack 12 includes a plurality of power generation cells 20 that generate power through an electrochemical reaction between an anode gas (fuel gas such as hydrogen) and a cathode gas (oxygen-containing gas such as air). The plurality of power generation cells 20 form a stack body 21 by being stacked in a vehicle width direction with the electrode surfaces in an upright orientation, in a state where the fuel cell stack 12 is mounted in the vehicle 11. The plurality of power generation cells 20 may instead be stacked in the vehicle length direction (front-rear direction) of the vehicle 11 or in the direction of gravity.

Each power generation cell 20 is formed by a membrane electrode assembly 22 (referred to below as an "MEA 22") and a pair of separators 24 sandwiching the MEA 22. The MEA 22 includes an electrolyte membrane 26 (e.g. a solid polymer electrolyte membrane (cation exchange membrane)), an anode 28 provided on one surface of the electrolyte membrane 26, and a cathode 30 provided on the other surface of the electrolyte membrane 26. The separators 24 in the pair form an anode gas flow field 32 through which the anode gas is made to flow and a cathode gas flow field 34 through which the cathode gas is made to flow, on respective surfaces thereof facing the MEA 22. Furthermore, a coolant flow field 36 through which coolant is made to flow is formed on the surfaces of the separators 24 in the pair facing each other, due to the stacking of the plurality of power generation cells 20.

The fuel cell stack 12 further includes a plurality of passages (anode gas passages, cathode gas passages, and coolant passages), not shown in the drawings, through which the anode gas, the cathode gas, and the coolant are respectively made to flow in the stacking direction of the stack body 21. The anode gas passages are in communication with the anode gas flow field 32, the cathode gas passages are in communication with the cathode gas flow field 34, and the coolant passages are in communication with the coolant flow field 36.

The fuel cell stack 12 is supplied with the anode gas by the anode system apparatus 14. The anode gas within the fuel cell stack 12 flows into the anode gas flow field 32 through the anode gas passage (anode gas inlet passage), and is used for power generation in the anode 28. The anode offgas (including unreacted hydrogen) that has been used for power generation flows out from the anode gas flow field 32 through the anode gas passage (anode gas outlet passage) to be discharged from the fuel cell stack 12 to the anode system apparatus 14.

The fuel cell stack 12 is supplied with the cathode gas by the cathode system apparatus 16. The cathode gas within the fuel cell stack 12 flows into the cathode gas flow field 34 through the cathode gas passage (cathode gas inlet passage), and is used for power generation in the cathode 30. The cathode offgas that has been used for power generation flows out from the cathode gas flow field 34 through the cathode gas passage (cathode gas outlet passage) to be discharged from the fuel cell stack 12 to the cathode system apparatus 16.

The fuel cell stack 12 is supplied with the coolant by the cooling apparatus 18. The coolant within the fuel cell stack 12 flows into the coolant flow field 36 through the coolant passage (coolant inlet passage), and cools the power generation cells 20. The coolant that has cooled the power generation cells 20 flows out from the coolant flow field 36 through the coolant passage (coolant outlet passage) to be discharged from the fuel cell stack 12 to the cooling apparatus 18.

The fuel cell stack 12 according to the present embodiment houses the stack body 21 inside a stack case. A terminal plate, an insulation plate, and an end plate are arranged outward in the stated order at each end of the stack body 21 in the stacking direction. The end plates provide a tightening load in the stacking direction of the power generation cells 20.

The anode system apparatus 14 of the fuel cell system 10 includes an anode supply path 40 for supplying the anode gas to the fuel cell stack 12, and an anode discharge path 42 for discharging the anode offgas from the fuel cell stack 12. Furthermore, an anode circulation path 44 for returning the unreacted hydrogen contained in the anode offgas in the anode discharge path 42 to the anode supply path 40 is connected between the anode supply path 40 and the anode discharge path 42. Yet further, a purge path 46 for discharging the anode offgas from the circulation circuit of the anode system apparatus 14 is connected to the anode circulation path 44.

A tank 47 that stores the anode gas (high-pressure hydrogen gas), which is not shown in the drawings, is connected to one end (upstream end) of the anode supply path 40. The tank 47 causes the anode gas to flow out to the anode supply path 40, based on the opening and closing of an in-tank electromagnetic valve (not shown in the drawings).

Furthermore, the anode system apparatus 14 includes a plurality of injectors 48 (valve apparatuses) capable of adjusting the flow rate of the anode gas to the fuel cell stack 12. A main injector 50 (first valve apparatus), which is one of the plurality of injectors 48, is provided in the anode supply path 40. The main injector 50 is mainly used during operation of the fuel cell system 10, opens and closes such that the anode gas on the upstream side (high-pressure side) of the anode supply path 40 has a prescribed pressure, and ejects the anode gas to the downstream side (low-pressure side). The main injector 50 operates alone when the power generation amount of the fuel cell stack 12 is less than or equal to a prescribed amount (when the supply pressure of the anode gas is less than or equal to a prescribed value). Furthermore, in addition to operating while normal power generation is implemented, the main injector 50 also operates when high-load power generation that increases the amount of current generated by the fuel cell stack 12 (power generation amount) is implemented and when low-load power generation that decreases the amount of current generated by the fuel cell stack 12 is implemented.

An ejector 52 is provided on the downstream side of the main injector 50 in the anode supply path 40. The ejector 52 supplies the anode gas to the fuel cell stack 12 on the downstream side while sucking in the anode offgas from the anode circulation path 44 using negative pressure generated by the movement of the anode gas ejected from the main injector 50.

A supplying bypass path 54 is connected to the anode supply path 40, bypassing the main injector 50 and the ejector 52. A BP (bypass) injector 51 (second valve apparatus: sub-injector), which is another of the plurality of injectors 48, is provided in the supplying bypass path 54.

When there is a demand for high-load power generation exceeding the amount of anode gas that can be supplied by the main injector 50 of the fuel cell stack 12, for example, the BP injector 51 opens and closes in a manner to cause the anode gas on the upstream side (high-pressure side) of the supplying bypass path 54 to have a prescribed pressure on the downstream side (low-pressure side), and increases the pressure the anode gas until the demanded value for the high-load power generation is reached. In this way, during the high-load power generation, the anode system apparatus 14 can increase the pressure of the anode gas until reaching a pressure corresponding to the power generation amount of the fuel cell stack 12. The plurality of injectors 48 are not limited to just the main injector 50 and the BP injector 51, and three or more injectors 48 may be provided. In a case where three or more injectors 48 are provided, the ratio of main (first valve apparatus) and sub (second valve apparatus) injectors can be set arbitrarily.

A gas-liquid separator 56 that separates water contained in the anode offgas (water generated during power generation) from the anode offgas is provided in the anode discharge path 42. The anode circulation path 44 is connected to the upper portion of the gas-liquid separator 56, and the anode offgas (gas) from which the water has been separated flows out to the anode circulation path 44 from the gas-liquid separator 56. An anode pump 58 that circulates the anode offgas through the anode supply path 40 is provided in the anode circulation path 44.

One end of a drain path 60 for discharging the separated water is connected to a bottom portion of the gas-liquid separator 56. A drain valve 60a that opens and closes the flow path is provided in the drain path 60. The purge path 46 is connected to the drain path 60, and a purge valve 46a that opens and closes the flow path is provided in the purge path 46.

The anode system apparatus 14 further includes a pressure sensor 62 that detects the pressure in the circulation circuit (the fuel cell stack 12, the anode supply path 40 downstream of the ejector 52, the anode discharge path 42, and the anode circulation path 44). The pressure sensor 62 according to the present embodiment is provided in the anode supply path 40, and directly detects the pressure near the downstream side of the plurality of injectors 48 (the pressure of the anode gas supplied to the fuel cell stack 12).

On the other hand, the cathode system apparatus 16 of the fuel cell system 10 includes a cathode supply path 64 for supplying the cathode gas to the fuel cell stack 12, and a cathode discharge path 66 for discharging the cathode offgas from the fuel cell stack 12. The cathode system apparatus 16 includes auxiliary equipment such as a compressor, a humidifier, and the like (not shown in the drawings), and supplies the fuel cell stack 12 with the cathode gas that has been compressed by the compressor and humidified by the humidifier.

The cooling apparatus 18 of the fuel cell system 10 includes a coolant supply path 68 for supplying the coolant to the fuel cell stack 12, and a coolant discharge path 70 for discharging the coolant from the fuel cell stack 12, and circulates the coolant between the cooling apparatus 18 and the fuel cell stack 12.

The fuel cell system 10 described above includes an ECU (Electronic Control Unit) 72 that performs the power generation of the fuel cell stack 12 by controlling the operation of each configurational element of the fuel cell system 10. The ECU 72 is formed by a computer (including a microcontroller) that includes one or more processors, a memory, and an input/output interface.

As an example, in a case where the vehicle 11 is travelling or the like, as shown in FIGS. 2A and 2B, the ECU 72 starts operating due to a manipulation by a user (occupant) of the vehicle 11 and activates the fuel cell system 10 that is in a stopped state. After this activation, the ECU 72 performs power generation (power generation during operation) using the fuel cell stack 12, and supplies the generated power to the battery Bt and the traction motor Mt. Then, when the operation of the vehicle 11 ends, the ECU 72 performs the stopping process for stopping the power generation of the fuel cell stack 12 (fuel cell system 10).

In the power generation during operation, the ECU 72 performs, in addition to the normal power generation, the high-load power generation or the low-load power generation, based on power generation demand commands of a motor ECU 88 that controls the traction motor Mt, the state of charge (SOC) of the battery BT, and the like. When the high-load power generation is performed, the amount of anode gas and cathode gas supplied to the fuel cell stack 12 is increased. Due to this, the power generation amount of the fuel cell stack 12 exceeds a prescribed high current value Ih (see the dotted line in FIG. 2A).

In the control of the anode system apparatus 14, the ECU 72 opens and closes (operates) only the main injector 50 among the plurality of injectors 48 during normal power generation that is less than or equal to the high current value Ih. Due to this, the anode gas is supplied to the fuel cell stack 12 through the anode supply path 40 (the main injector 50 and the ejector 52).

On the other hand, in the high-load power generation exceeding the high current value Ih, the ECU 72 opens and closes (operates) the BP injector 51 in addition to operating the main injector 50. Due to this, the amount of anode gas flowing through both the anode supply path 40 and the supplying bypass path 54 to be supplied to the fuel cell stack 12 is increased. In other words, when the power generation amount in FIG. 2A exceeds the high current value Ih, the BP injector 51 is set to the ON state (operation: opening/closing performed).

Furthermore, the ECU 72 monitors the supply state of the anode gas to the fuel cell stack 12, by detecting the pressure inside the circulation circuit (anode gas flow field) of the anode system apparatus 14 using the pressure sensor 62 during the power generation during operation. For example, the ECU 72 lowers the pressure in the circulation circuit by lengthening the closed time period of the injectors 48 when the anode gas pressure is high. Furthermore, during the high-load power generation, the ECU 72 judges the BP injector 51 to be malfunctioning if the anode gas pressure is not greater than or equal to a prescribed value even though the BP injector 51 is in the driven state.

The high-load power generation is demanded according to the travel state or the like of the vehicle 11, and there are cases where the high-load power generation is not performed even once during a single operation (during the series of processes including activation, power generation during operation, and the stopping process) of the fuel cell system 10. In other words, with a conventional fuel cell system, if the BP injector is not used during the power generation during operation, the operation is stopped without the BP injector having operated.

In contrast to this, the fuel cell system 10 (ECU 72) according to the present embodiment is configured to operate all of the plurality of injectors 48 once during the single operation. In other words, since the main injector 50 is certain to operate during the single operation, the BP injector 51 operates at least once. In accordance with the operation of this BP injector 51, the ECU 72 performs an operational check of judging the malfunction state (normal or abnormal) of the BP injector 51. For example, as shown in FIG. 2B, if the high-load power generation has not been performed in the power generation during operation, the ECU 72 checks the malfunction state of the BP injector 51 by causing the BP injector 51 to operate (set to the ON state) during implementation of the stopping process.

Figure 3:
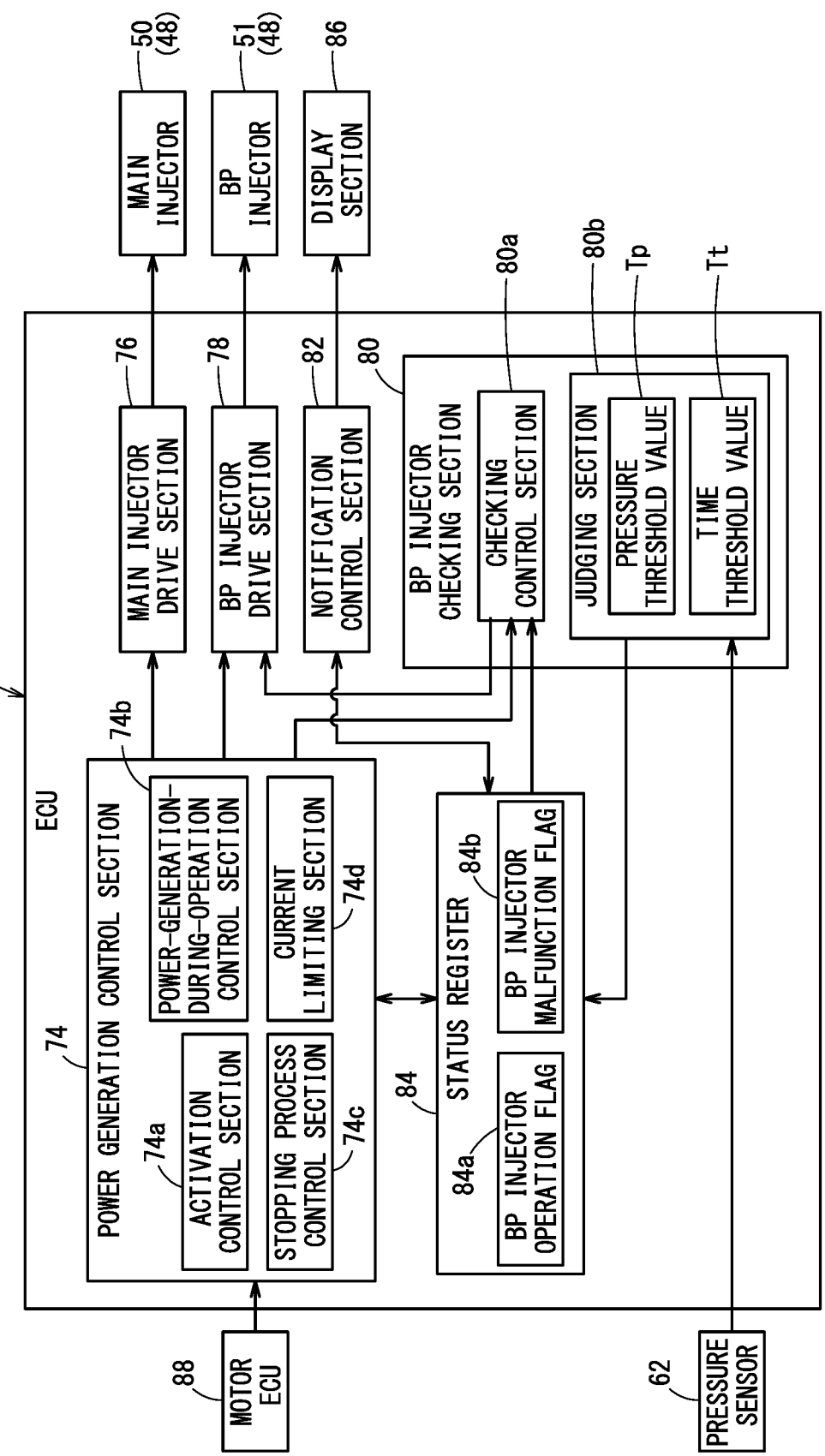
FIG. 3 is a function block diagram of an ECU of the fuel cell system.

Therefore, by having the processor execute a program (not shown in the drawings) stored in a memory, the ECU 72 creates the function blocks such as shown in FIG. 3 and performs the operational check. Specifically, a power generation control section 74, a main injector drive section 76, a BP injector drive section 78, a BP injector checking section 80, and a notification control section 82 are created within the ECU 72.

The power generation control section 74 is a function section for controlling the operation of the fuel cell system 10 during the single operation. An activation control section 74a that controls the activation operation of the fuel cell system 10, a power-generation-during-operation control section 74b that controls the operation of the power generation during operation, and a stopping process control section 74c that controls the operation of the stopping process are provided in the power generation control section 74. Furthermore, the power generation control section 74 includes a current limiting section 74d that limits the power generation amount of the fuel cell stack 12 as needed.

The main injector drive section 76 controls the operational state (opening and closing) of the main injector 50 based on operating commands of the power generation control section 74. Similarly, the BP injector drive section 78 controls the operational state (opening and closing) of the BP injector 51 based on operating commands of the power generation control section 74.

The BP injector checking section 80 causes the BP injector 51 to operate during the single operation and judges the state (normal or abnormal) of the BP injector 51. A checking control section 80a that issues instructions to the BP injector drive section 78 in order to check the BP injector 51 and a judging section 80b that judges the state (normal or abnormal) of the BP injector 51 are provided in the BP injector checking section 80.

Here, when the high-load power generation is implemented in the power generation during operation and the BP injector 51 has operated, there is no need to check the BP injector 51. Therefore, the ECU 72 manages the BP injector 51 during the single operation, using a BP injector operation flag 84a of a status register 84. The power generation control section 74 raises (sets to 1) the BP injector operation flag 84a if the BP injector 51 has operated in the power generation during operation or the like. On the other hand, the power generation control section 74 sets the BP injector operation flag 84a to 0 if the BP injector 51 does not operate. The BP injector operation flag 84a is reset in a state where the vehicle 11 is stopped (soaked).

Figure 4A:
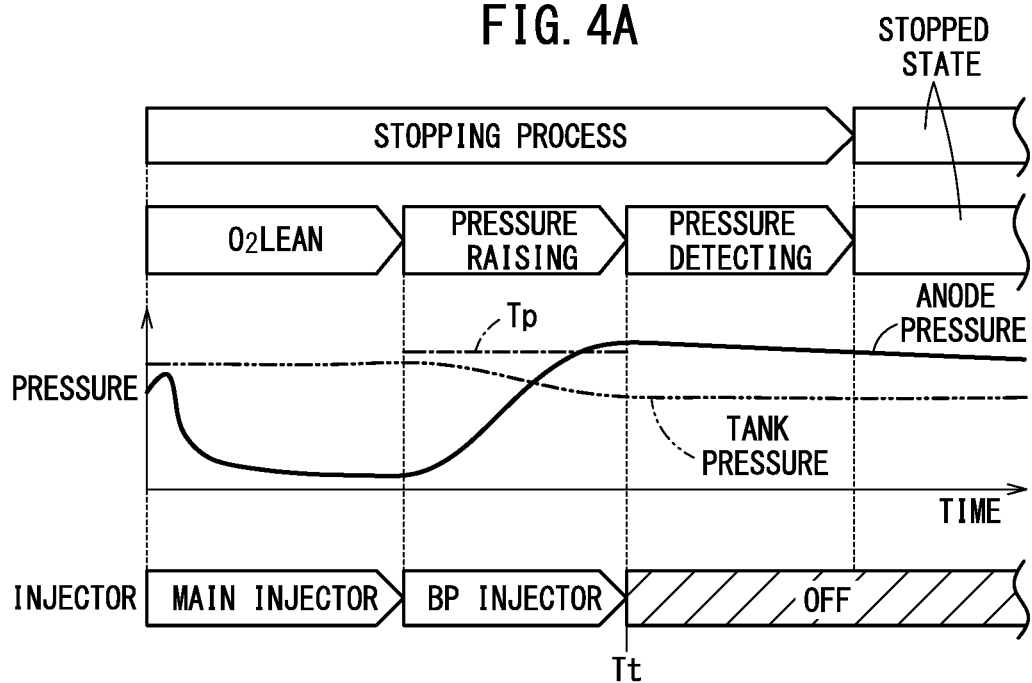
FIG. 4A is a graph showing an example of pressure change in a case where the BP injector is normal in a stopping process.
Figure 4B:
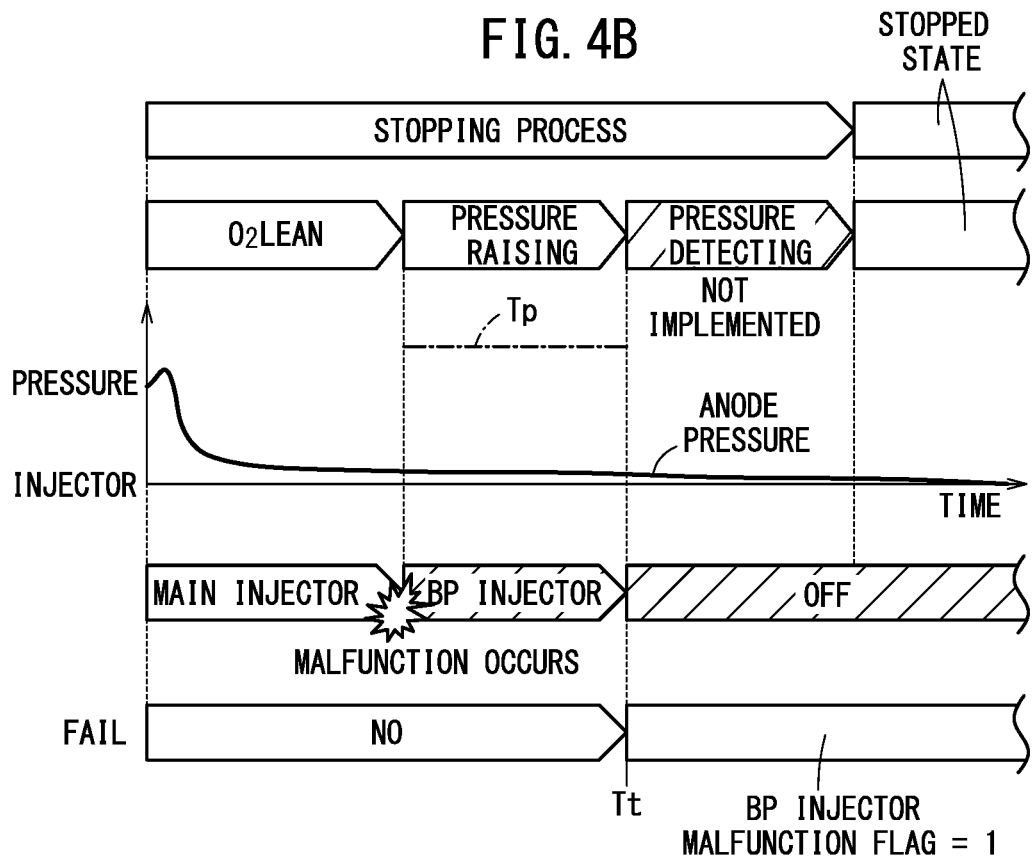
FIG. 4B is a graph showing an example of pressure change in a case where the BP injector is abnormal in the stopping process.

The checking control section 80a checks the BP injector operation flag 84a during the stopping process, and operates the BP injector 51 during the stopping process if the BP injector operation flag 84a is 0. As shown in FIGS. 4A and 4B, the stopping process control section 74c implements an $O_2$ lean step, a pressure raising step, and a pressure detecting step sequentially in the stopping process. In other words, the fuel cell system 10 enters the stopped state (soaked state) in which the fuel cell system 10 is completely stopped, after each step of the stopping process has been implemented.

The $O_2$ lean step is a process of restricting the effect of oxygen on the power generation cells 20 in the stopped state, by decreasing the oxygen concentration (making the $O_2$ lean) and increasing the nitrogen concentration in the fuel cell stack 12. For example, in the $O_2$ lean step, the ECU 72 rotates a circulation pump (not shown in the drawings) of the cathode system apparatus 16 to circulate the cathode gas, performs the power generation of the fuel cell stack 12, and consumes the remaining cathode gas. Therefore, during the $O_2$ lean step, the ECU 72 operates the anode system apparatus 14 as well to suitably supply the anode gas to the fuel cell stack 12.

The pressure raising step is a process for setting a target anode pressure within the flow field by increasing the pressure in the anode gas flow field 32 (circulation circuit) of the fuel cell stack 12. In this way, the fuel cell system 10 facilitates shortening of the subsequent activation time and restricts cross-leakage of nitrogen in the stopped state.

The pressure detecting step is a step of, after the pressure raising step, monitoring the pressure change of the anode gas flow field 32 by detecting the anode pressure of the fuel cell stack 12. In this way, the fuel cell system 10 can judge leakage or the like of the anode gas of the anode system apparatus 14 and can suitably manage the anode pressure.

The checking control section 80a operates the BP injector 51 and checks the state of the BP injector 51, during the stopping process described above. Specifically, the checking control section 80a operates the BP injector 51 during the pressure raising step, and raises the anode pressure in the circulation circuit. Here, if the BP injector 51 is normal (not malfunctioning), the pressure in the anode gas flow field 32 of the fuel cell stack 12 increases significantly during the pressure raising step. Furthermore, the pressure in the tank 47 drops (see the two-dot chain line in FIG. 4A) relative to the increase of the anode pressure.

On the other hand, if the BP injector 51 is abnormal (has closing malfunction), the pressure in the anode gas flow field 32 of the fuel cell stack 12 barely increases during the pressure raising step. Accordingly, the judging section 80b of the BP injector checking section 80 can easily judge that the BP injector 51 is abnormal based on the pressure detected by the pressure sensor 62.

Specifically, the judging section 80b has a pressure threshold value Tp and, when the BP injector 51 operates, judges whether the pressure value of the pressure sensor 62 exceeds the pressure threshold value Tp. The pressure threshold value Tp may be set to a suitable value according to the anode pressure that is raised in the pressure raising step. Furthermore, the judging section 80b includes a time threshold value Tt, performs a time count from the start of the operation of the BP injector 51, and judges whether the pressure value exceeds the pressure threshold value Tp during a period up to when the time count exceeds the time threshold value Tt. The implementation time of the pressure raising step, for example, may be set as-is as the time threshold value Tt. If the pressure value has exceeded the pressure threshold value Tp within the time threshold value Tt, it is judged that the BP injector 51 is normal, and the judging section 80b sets a BP injector malfunction flag 84b of the status register 84 to 0. On the other hand, if the pressure value remains less than or equal to the pressure threshold value Tp until the time threshold value Tt has been exceeded, the BP injector 51 is judged to be abnormal and the judging section 80b sets the BP injector malfunction flag 84b of the status register 84 to 1. The BP injector malfunction flag 84b is reset when the battery Bt is removed for maintenance of the BP injector 51 or the like.

Furthermore, the checking control section 80a stops the operation of the BP injector 51 after judging the state of the BP injector 51 (when the pressure raising step is finished). At this time, the ECU 72 does not perform the subsequent pressure detecting step if the BP injector 51 is abnormal (if the BP injector malfunction flag 84b is 1). This is because even if the pressure detection step is performed, only an abnormal state in which the anode pressure is low is detected, and it is known that the cause of the low anode pressure is an abnormality in the BP injector 51.

Returning to FIG. 3, if the BP injector 51 is abnormal (malfunctioning), the notification control section 82 of the ECU 72 issues a notification to the user via a display section 86 of the vehicle 11. For example, the notification control section 82 monitors the status register 84 when the fuel cell system 10 is activated next (when the activation control section 74a operates), and issues a notification having notification content that is in accordance with a malfunction code, if the BP injector malfunction flag 84b is 1. A monitor or indicator provided on the driver's seat of the vehicle 11 is used as the display section 86. The malfunction notification may be issued using sound, via a speaker or the like (not shown in the drawings).

The fuel cell system 10 according to the present embodiment is basically configured in the manner described above, and the following describes the operation thereof (process for implementing the operational check of the BP injector 51).

The ECU 72 controls the operation of each configurational element of the fuel cell system 10 during a single operation, which is made up of the activation, power generation during operation, and stopping process, using the power generation control section 74. When the power generation during operation is implemented, the power-generation-during-operation control section 74b controls the generated current amount of the fuel cell stack 12 by adjusting the supply amounts of the anode gas and the cathode gas according to the power generation demand commands of the motor ECU 88, the travel state of the vehicle 11, the SOC of the battery Bt, and the like.

When the normal power generation is performed in the power generation during operation, the power-generation-during-operation control section 74b operates only the main injector 50 and supplies the anode gas to the fuel cell stack 12. On the other hand, when the high-load power generation is performed, the power-generation-during-operation control section 74b operates the BP injector 51 in addition to the main injector 50, to supply the anode gas to the fuel cell stack 12. When the BP injector 51 has operated, the BP injector operation flag 84a is set to 1.

Furthermore, upon receiving operation stop commands (OFF signals for an ignition or starter switch) from the vehicle 11, the power generation control section 74 performs the stopping process with the stopping process control section 74c. In the stopping process, as shown in FIG. 4A, the $O_2$ lean step, the pressure raising step, and the pressure detecting step are performed sequentially.

In the $O_2$ lean step, the stopping process control section 74c operates the main injector 50 to supply the anode gas to the fuel cell stack 12. In this way, the fuel cell stack 12 performs power generation using the anode gas supplied from the anode system apparatus 14 and the cathode gas circulating in the cathode system apparatus 16.

After the $O_2$ lean step, the stopping process control section 74c performs the pressure raising step. At this time, the BP injector checking section 80 of the ECU 72 performs an operational check of the BP injector 51 as needed, based on the process flow shown in FIG. 5. Specifically, the checking control section 80a of the BP injector checking section 80 monitors the BP injector operation flag 84a and judges whether the BP injector 51 has not operated during the single operation (step S1). If the BP injector 51 has operated, that is, if the BP injector operation flag 84a is 1 (step S1: NO), the stopping process control section 74c proceeds to step S2 and performs the pressure raising step during the operation of the main injector 50. On the other hand, if the BP injector 51 has not yet operated, that is, if the BP injector operation flag 84a is 0 (step S1: YES), the stopping process control section 74c proceeds to step S3 and performs the pressure raising step during the operation of the BP injector 51 performed by the checking control section 80a. The checking control section 80a performs an implementation time count during this operation of the BP injector 51.

In accordance with the operation of the BP injector 51, the judging section 80b judges whether the anode pressure (pressure value detected by the pressure sensor 62) of the fuel cell stack 12 has exceeded the pressure threshold value Tp (step S4). If the anode pressure has exceeded the pressure threshold value Tp (step S4: YES), the process moves to step S5, and if the anode pressure is less than or equal to the pressure threshold value Tp, the process moves to step S7.

If the anode pressure has exceeded the pressure threshold value Tp, this means that the BP injector 51 is operating stably, i.e. the BP injector 51 is normal. Therefore, at step S5, the BP injector malfunction flag 84b remains at 0. Furthermore, at step S6, the stopping process control section 74c implements the pressure raising step until completed, and then implements the pressure detecting step. The stopping process control section 74c ends the stopping process when the pressure detecting step has been implemented, thereby completing the single operation of the fuel cell system 10.

On the other hand, if the anode pressure is less than or equal to the pressure threshold value Tp, at step S7, the count time of the operation of the BP injector 51 is compared to the time threshold value Tt, and a judgment is made as to whether the count time has exceeded the time threshold value Tt. If the count time has exceeded the time threshold value Tt, the process moves to step S8, and if the count time is less than or equal to the time threshold value Tt, the process returns to step S3 and the operation of the BP injector 51 continues.

If the count time has exceeded the time threshold value Tt, this means that the amount of anode gas supplied by the BP injector 51 did not increase in the time period during which the pressure raising step was implemented, i.e. that the BP injector 51 is abnormal. Therefore, at step S8, the BP injector malfunction flag 84b is set to 1. Furthermore, at step S9, after ending the pressure raising step, the stopping process control section 74c ends the stopping process without implementing the following pressure detecting step. In this way, the single operation of the fuel cell system 10 is completed.

Figure 6:
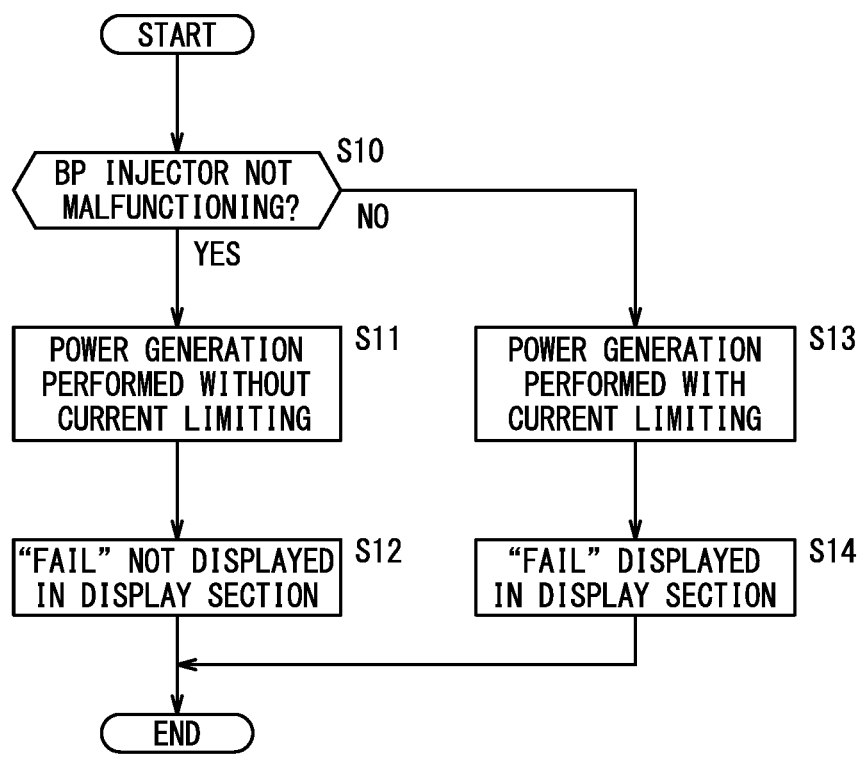
FIG. 6 is a flow chart showing the process flow of an operational check when the fuel cell system is activated.

Then, during the next activation of the fuel cell system 10, the ECU 72 implements a suitable process based on the information stored in the status register 84, as shown in FIG. 6. Specifically, the activation control section 74a of the power generation control section 74 checks the BP injector malfunction flag 84b during the activation, and judges whether there is no malfunction in the BP injector 51 (step S10). If the BP injector 51 is not malfunctioning, i.e. if the BP injector malfunction flag 84b is 0 (step S10: YES), the power generation control section 74 implements normal power generation (power generation during operation) without performing current limiting by the current limiting section 74d (step S11).

Furthermore, in a case where the BP injector 51 is not malfunctioning, the notification control section 82 performs a process to not issue a notification of a malfunction to the user (not displaying "fail" in the display section 86) (step S12). Then, after the activation operation of the fuel cell system 10 is finished, the power generation control section 74 transitions to the power generation during operation without a current limitation.

On the other hand, if the BP injector 51 is malfunctioning, i.e. if the BP injector malfunction flag 84b is 1 (step S10: NO), the power generation control section 74 implements the power generation with the current limiting by the current limiting section 74d (step S13). In this case, by setting a prescribed current limitation value, the current limiting section 74d regulates the control of each configurational element performed by the power generation control section 74 to cause the fuel cell stack 12 to generate power at or below a current limitation value. Therefore, during the power generation during operation, the power generation control section 74 sets an upper limit for the supply amount of the anode gas such that the upper limit corresponds to the high current value Ih or less (see FIGS. 2A and 2B) and limits the cathode gas to a supply amount corresponding to the upper limit, so as not to implement the high-load power generation. In this way, the fuel cell system 10 can protect the fuel cell stack 12 from deterioration.

Furthermore, if the BP injector 51 is malfunctioning, the notification control section 82 issues a notification of the malfunction to the user (displays "fail" in the display section 86) (step S14). In this way, the user can recognize that current limiting is being applied to the power generation of the fuel cell system 10 due to an abnormality in the BP injector 51, and the user can therefore quickly implement the necessary countermeasures.

The present invention is not limited to the above-described embodiments, and various alterations can be made within the scope of the present invention. For example, the operational check in the present invention is not limited to an operational check of the plurality of injectors 48 of the anode system apparatus 14, and can also be applied when performing an operational check of a valve apparatus (not shown in the drawings) of the cathode system apparatus 16. As an example, it is possible to conceive of applying this operational check to a configuration in which a first valve apparatus is included in the cathode supply path 64 of the cathode system apparatus 16 and a second valve apparatus is included in a bypass path that bypasses the humidifier in this cathode supply path 64.

Furthermore, the operational check of the BP injector 51 is not limited to being implemented during the stopping process, and may be implemented any time during the single operation of the fuel cell system 10, for example, during activation, or during the power generation during operation.

As an example of performing an operational check of the BP injector 51 during activation, the check is performed when the state of the status register 84 is reset (deleted) and the state of the BP injector 51 becomes unknown. Specifically, when the battery Bt is removed from the vehicle 11 for maintenance of the vehicle 11 or the like, the state of the status register 84 is reset, and the history of the operational checks of the BP injector 51 can become unknown. Accordingly, when the history of the status register 84 has been reset, the ECU 72 performs the operational check of the BP injector 51 during activation. In this way, it is possible to recognize the state of the BP injector 51 (judge whether it is normal or abnormal) before implementing the power generation during operation after the maintenance.

As another example, the operational check of the BP injector 51 during the power generation during operation may include a process in which, during normal power generation, the operation of the main injector 50 is stopped and the BP injector 51 is operated. By monitoring the pressure change of the anode gas caused by this switching, the ECU 72 can check the state of the BP injector 51.

Figure 7:
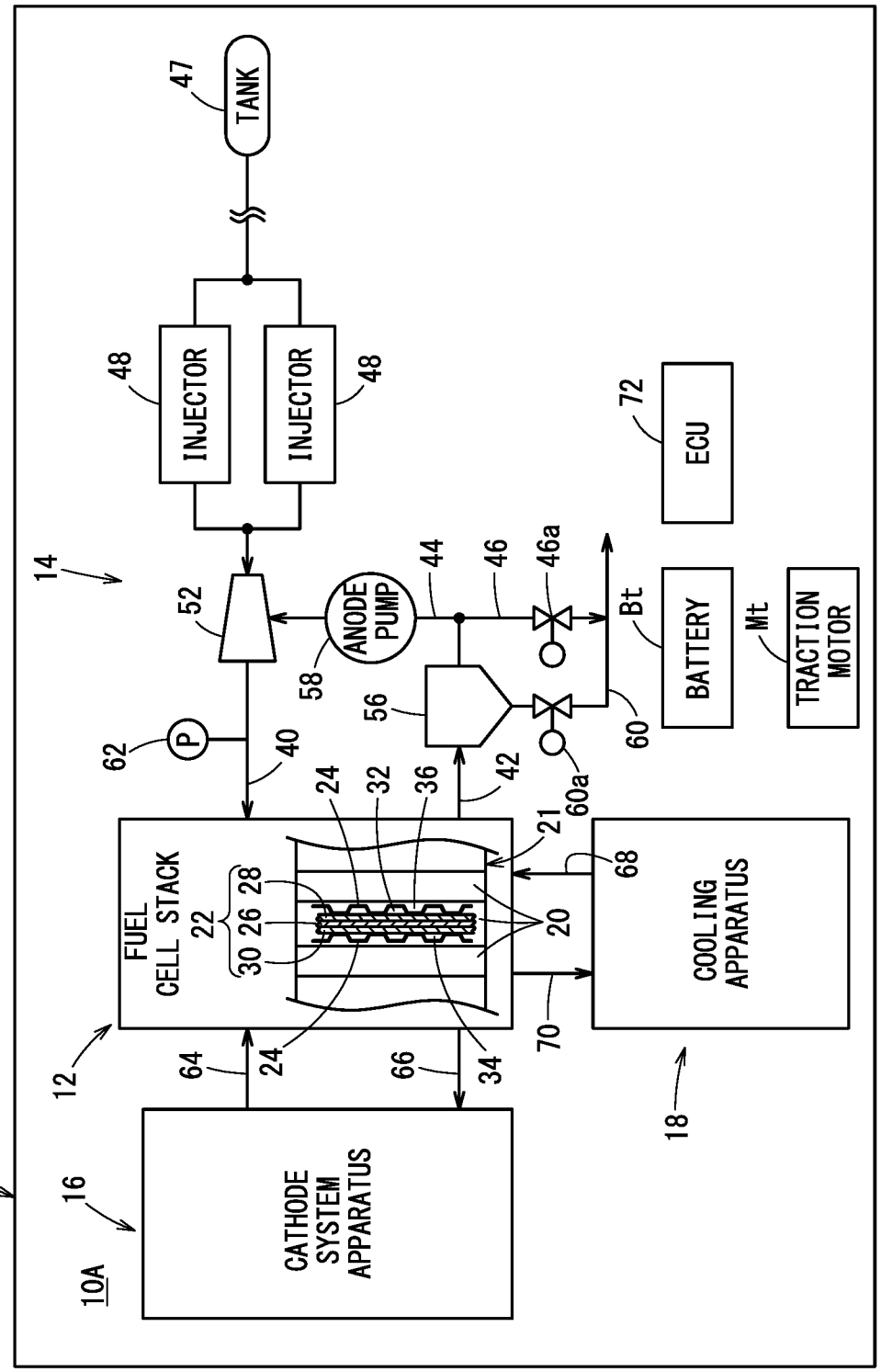
FIG. 7 is a descriptive diagram showing an overall configuration of a fuel cell system according to a modification of the present invention.

As shown in FIG. 7, the operational check of the present invention can also be applied to a fuel cell system 10A in which the plurality of injectors 48 are provided in parallel on the upstream side of the ejector 52. In such a case, one of the plurality of injectors 48 corresponds to the first valve apparatus, and the remaining injectors 48 correspond to the second valve apparatus.

The following describes the technical concepts and effects that can be understood from the embodiments described above.

A first aspect of the present invention is a fuel cell system 10, 10A comprising a fuel cell stack 12; a plurality of valve apparatuses (injectors 48) capable of adjusting a flow rate of a reactant gas supplied to the fuel cell stack 12; and a control section (ECU 72) for controlling operation of the plurality of valve apparatuses, wherein the plurality of valve apparatuses include a first valve apparatus (main injector 50) that operates when the fuel cell stack 12 generates power that is less than or equal to a prescribed power generation amount, and a second valve apparatus (BP injector 51) that operates in addition to the first valve apparatus when the fuel cell stack 12 generates power that exceeds the prescribed power generation amount; and the control section performs an operational check of causing the second valve apparatus to operate at least once and judging whether the second valve apparatus is normal or abnormal, during a period from when the fuel cell system 10, 10A is activated to when the fuel cell system 10, 10A stops.

The fuel cell system 10, 10A can quickly and reliably recognize an abnormality in the second valve apparatus, by performing the operational check of the second valve apparatus (BP injector 51) at least once during the single operation from when the fuel cell system 10, 10A is activated to when the fuel cell system 10, 10A stops. Then, by recognizing the abnormality in the second valve apparatus, the fuel cell system 10, 10A can prevent the supply amount of the reactant gas supplied to the fuel cell stack 12 from becoming insufficient, restrict unstable power generation, and stop deterioration of the fuel cell stack 12.

The fuel cell system 10, 10A further comprises a pressure sensor 62 that detects pressure of the reactant gas supplied to the fuel cell stack 12, and the control section (ECU 72) judges the second valve apparatus (BP injector 51) to be normal if a pressure value detected by the pressure sensor 62 has exceeded a pressure threshold value Tp within a prescribed time during which the second valve apparatus is operating, and judges the second valve apparatus to be abnormal if the pressure value does not exceed the pressure threshold value Tp within the prescribed time. In this way, the fuel cell system 10, 10A can easily judge whether the second valve apparatus is normal or abnormal, based on the pressure detected by the pressure sensor 62.

Furthermore, if the control section (ECU 72) judges the second valve apparatus (BP injector 51) to be abnormal, the control section limits a power generation amount of the fuel cell stack 12. By limiting the power generation amount of the fuel cell stack 12 when the second valve apparatus is abnormal, the fuel cell system 10, 10A can eliminate the insufficiency of one reactant gas caused by the demand for high-load power generation and restrict the deterioration of the fuel cell stack 12 and the worsening of fuel efficiency.

The control section (ECU 72) judges whether the second valve apparatus (BP injector 51) has operated in power generation during operation that is performed after activation of the fuel cell system 10, 10A, does not perform the operational check if the second valve apparatus has operated, and performs the operational check during a stopping process of the fuel cell system 10, 10A if the second valve apparatus has not operated. In this way, the fuel cell system 10, 10A can reliably perform the operational check during a single operation, and can avoid implementing unnecessary operational checks.

In the stopping process, an $O_2$ lean step of lowering oxygen concentration in the fuel cell stack 12, a pressure raising step of increasing pressure in a flow field (anode gas flow field 32) for the reactant gas, and a pressure detecting step of monitoring a pressure change in the flow field for the reactant gas are sequentially implemented, and the control section (ECU 72) performs the operational check in the pressure raising step. In this way, the fuel cell system 10, 10A operates the second valve apparatus at a timing when it is necessary to increase the pressure in the reactant gas flow field, and can favorably perform the operational check.

If the second valve apparatus (BP injector 51) has operated in the power generation during operation, the control section (ECU 72) operates the first valve apparatus (main injector 50) in the pressure raising step. In this way, if the operational check of the second valve apparatus is not performed, the pressure raising step can be performed stably.

If the control section (ECU 72) performs the operational check during the stopping process and judges the second valve apparatus (BP injector 51) to be abnormal, the control section issues a notification to a user that the second valve apparatus is abnormal when the fuel cell system 10, 10A is activated next. In this way, the fuel cell system 10, 10A can smoothly notify the user of the abnormality in the second valve apparatus.

If there is no history of judgment as to whether the second valve apparatus (BP injector 51) is normal or abnormal, the control section (ECU 72) performs the operational check during activation of the fuel cell system 10, 10A. By promptly performing the operational check of the second valve apparatus, the fuel cell system 10, 10A can recognize whether the second valve apparatus is normal or abnormal before implementing the power generation during operation, and makes it possible to adopt suitable countermeasures when the second valve apparatus is abnormal.

The reactant gas is anode gas supplied to an anode 28 of a power generation cell 20 in the fuel cell stack 12; and the plurality of valve apparatuses are injectors 48 that adjust an amount of the anode gas supplied to the fuel cell stack 12. In this way, the fuel cell system 10, 10A can easily check whether the plurality of injectors supplying the anode gas are normal or abnormal.

The first valve apparatus (main injector 50) is provided on an upstream side of an ejector 52 that causes anode offgas flowing out from the fuel cell stack 12 to merge with anode gas; and the second valve apparatus (BP injector 51) is provided in a bypass path (supplying bypass path 54) that bypasses the first valve apparatus and the ejector 52. In this way, the fuel cell system 10 can favorably perform the operational check of the second valve apparatus provided in the bypass path.

What is claimed is:

1. A fuel cell system comprising:
a fuel cell stack;
a plurality of valve apparatuses configured to adjust a flow rate of a reactant gas supplied to the fuel cell stack; and
a control section configured to control operation of the plurality of valve apparatuses, wherein:
the plurality of valve apparatuses include a first valve apparatus configured to operate when the fuel cell stack generates power that is less than or equal to a prescribed power generation amount, and a second valve apparatus configured to operate in addition to the first valve apparatus when the fuel cell stack generates power that exceeds the prescribed power generation amount;
the control section includes one or more processors; and
the one or more processors are configured to perform an operational check of causing the second valve apparatus to operate at least once and judging whether the second valve apparatus is normal or abnormal, during a period from when the fuel cell system is activated to when the fuel cell system stops, wherein the one or more processors:
are operable to judge whether the second valve apparatus has operated in power generation during operation that is performed after activation of the fuel cell system,
do not perform the operational check if the second valve apparatus has operated, and
perform the operational check during a stopping process of the fuel cell system if the second valve apparatus has not operated.

2. The fuel cell system according to claim 1, further comprising a pressure sensor configured to detect pressure of the reactant gas supplied to the fuel cell stack, wherein
the one or more processors judge the second valve apparatus to be normal if a pressure value detected by the pressure sensor has exceeded a pressure threshold value within a prescribed time during which the second valve apparatus is operating, and judge the second valve apparatus to be abnormal if the pressure value does not exceed the pressure threshold value within the prescribed time.

3. The fuel cell system according to claim 1, wherein
if the one or more processors judge the second valve apparatus to be abnormal, the one or more processors limit a power generation amount of the fuel cell stack.

4. The fuel cell system according to claim 1, wherein:
in the stopping process, an O2 lean step of lowering oxygen concentration in the fuel cell stack, a pressure raising step of increasing pressure in a flow field for the reactant gas, and a pressure detecting step of monitoring a pressure change in the flow field for the reactant gas are sequentially implemented; and
the one or more processors perform the operational check in the pressure raising step.

5. The fuel cell system according to claim 4, wherein if the second valve apparatus has operated in the power generation during operation, the one or more processors operate the first valve apparatus in the pressure raising step.

6. The fuel cell system according to claim 1, wherein
if the one or more processors perform the operational check during the stopping process and judge the second valve apparatus to be abnormal, the one or more processors issue a notification to a user that the second valve apparatus is abnormal when the fuel cell system is activated next.

7. A fuel cell system comprising:
a fuel cell stack;
a plurality of valve apparatuses configured to adjust a flow rate of a reactant gas supplied to the fuel cell stack; and
a control section configured to control operation of the plurality of valve apparatuses, wherein:
the plurality of valve apparatuses include a first valve apparatus configured to operate when the fuel cell stack generates power that is less than or equal to a prescribed power generation amount, and a second valve apparatus configured to operate in addition to the first valve apparatus when the fuel cell stack generates power that exceeds the prescribed power generation amount;

the control section includes one or more processors:

the one or more processors are configured to perform an operational check of causing the second valve apparatus to operate at least once and judging whether the second valve apparatus is normal or abnormal, during a period from when the fuel cell system is activated to when the fuel cell system stops, and wherein if there is no history of judgment as to whether the second valve apparatus is normal or abnormal, the one or more processors are configured to perform the operational check during activation of the fuel cell system.

8. The fuel cell system according to claim 1, wherein:

the reactant gas is anode gas supplied to an anode of a power generation cell in the fuel cell stack; and the plurality of valve apparatuses are injectors configured to adjust an amount of the anode gas supplied to the fuel cell stack.

9. The fuel cell system according to claim 7, wherein:

the first valve apparatus is provided on an upstream side of an ejector configured to cause anode offgas flowing out from the fuel cell stack to merge with anode gas; and the second valve apparatus is provided in a bypass path configured to bypass the first valve apparatus and the ejector.

* * * * *